Oct. 1, 1929.  S. T. SMITH  1,730,096
PIPE TONGS
Filed Jan. 25, 1927  2 Sheets-Sheet 1

INVENTOR.
SAMUEL T. SMITH,
BY Fred W. Manis
ATTORNEY.

Oct. 1, 1929.   S. T. SMITH   1,730,096
PIPE TONGS
Filed Jan. 25, 1927   2 Sheets-Sheet 2
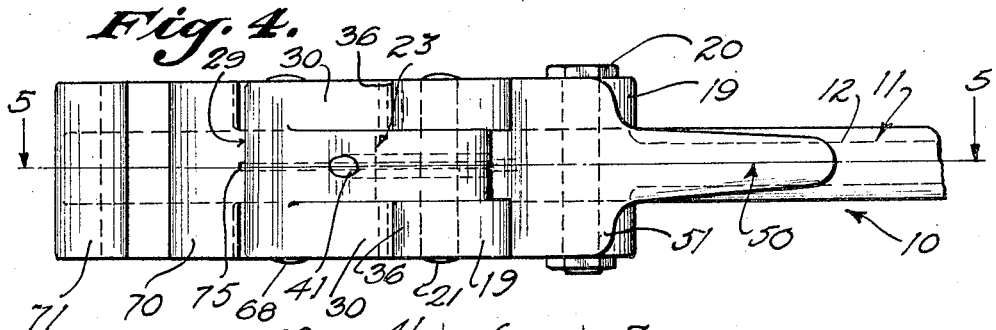
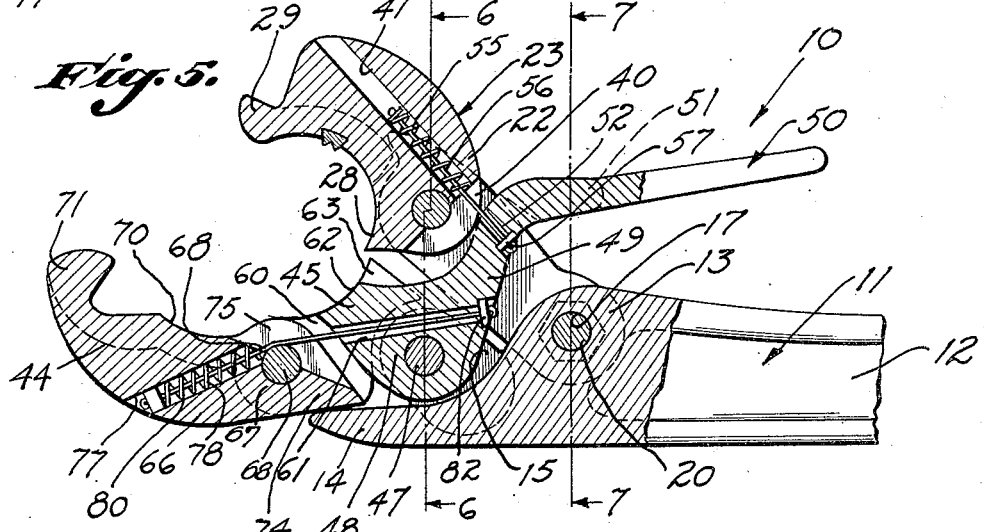
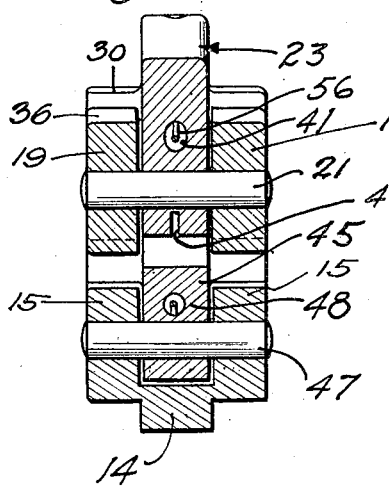
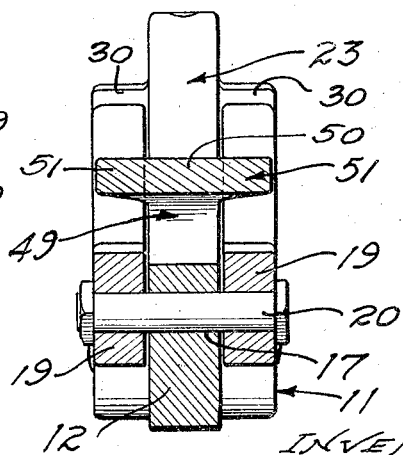
INVENTOR:
SAMUEL T. SMITH.
BY
ATTORNEY.

Patented Oct. 1, 1929

1,730,096

UNITED STATES PATENT OFFICE

SAMUEL T. SMITH, OF LOS ANGELES, CALIFORNIA

PIPE TONGS

Application filed January 25, 1927. Serial No. 163,322.

My invention relates to tools for handling pipe, shafting and other cylindrical objects and particularly to pipe tongs.

While this invention may be used in many different arts, it is particularly adapted for use in the oil well art. In drilling an oil well with a rotary rig, the drill pipe must be removed from the well frequently to change bits, etc., this being accomplished by unscrewing joints of the pipe to separate it into stands of about eighty feet in length each. In the production of oil from a finished well it is also necessary, for various reasons, to occasionally remove the pump tubing in the same manner. For making and breaking the joints in pipe or tubing when this is run into or removed from a well, two pipe tongs are applied to the pipe, one on each side of the joint. In order to accomplish this operation quickly, the tongs must be easy to apply, sure in grip, and easy to remove.

It is an object of my invention to provide a pair of pipe tongs which need only be moved into contact with a pipe to cause the tongs to encircle the pipe in gripping relation therewith.

It is another object of my invention to provide a pair of pipe tongs which are automatically locked in gripping relation with the pipe until an unlocking means is manually operated.

A further object of my invention is to provide a pair of pipe tongs which has but few working parts and which therefore will not readily get out of repair.

Further objects and advantages will be made manifest in the following description and in the drawings, in which, Fig. 1 is a plan view showing a preferred embodiment of the pipe tongs of my invention with the members thereof disposed in open position.

Fig. 4 is an edge elevation taken in the direction of the arrow 4 of Fig. 1.

Fig. 5 is an interfacial longitudinal sectional view through the head portion of the tongs taken on the line 5—5 of Fig. 4.

Figs. 6 and 7 are sectional views taken on the correspondingly numbered lines of Fig. 5.

Figure 1:
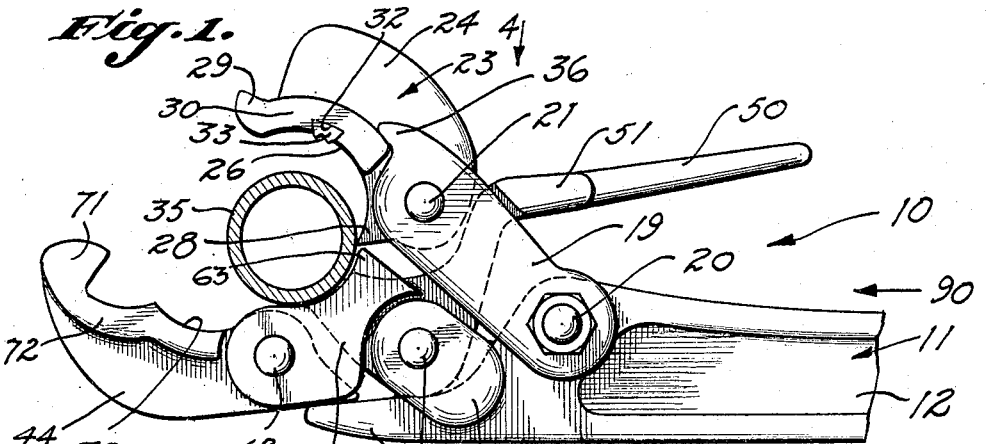

In describing the tongs of my invention in detail, the parts will be referred to in the relation which they have been in "open position", as illustrated in Figs. 1 and 4 to 7.

The tongs 10 of my invention include a handle 11 which comprises an arm portion 12, of I-shaped cross section, and a head 13, opposite faces of which are substantially parallel and which is shaped, as clearly shown in Fig. 5, to provide a horn 14 at the extreme end thereof. At the point where the horn 14 joins the head 13, a pair of ears 15 project from the head so that the inner faces of the ears 15 are substantially in the same plane as the outer faces of the head 13. A hole 17 is provided in the widest portion of the head 13 near the opposite side thereof from the horn 14.

A pair of flat links 19 are pivotally secured to the head 13 by a bolt 20 which passes through the hole 17 and suitable holes provided in ends of the links 19. The opposite ends of the links 19 are pivotally secured by a pin 21 to an end 22 of a free jaw 23. The free jaw 23 has a body 24 which is of substantially the same thickness as the head 13, and is provided with a gripping face 26 on the inner edge thereof. The free jaw 23 has an operating heel 28 at the end of the gripping face 26 near the pin 21, and a latching toe 29 provided at the opposite end of the gripping face 26. The body 24 of the free jaw 23 is reinforced along the gripping face 26 by flanges 30 which extend from and are integral with the body 24. A tooth seat 32 is formed in the gripping face 26 of the free jaw 23, a tooth 33 of very hard metal being so shaped as to snugly fit into the seat 32. The radius of curvature of the gripping face 26 is slightly larger than the radius of a pipe 35 upon which the tongs are adapted to be used. The inner ends of the flanges 30 engage with projections 36 formed upon the links 19, thereby limiting the outward rotation of the free jaw 23 relative to the links 19.

As clearly shown in Fig. 5, a narrow slot 40 is formed in the inner end of the free jaw 23 in a plane lying medially between the side faces of the jaw body 24, and a bore 41 is formed longitudinally through the jaw 23 to communicate between the slot 40 and the opposite end of the jaw, for a purpose to be described later.

A latch jaw 44 is supported by a link element 45 which is of substantially the same thickness as the handle head 13 and which is pivotally mounted between the ears 15 by a pin 47. The link element 45 has a central body portion 48 from which a neck 49 extends rearwardly between the links 19 and terminates in an unlocking handle 50 which extends rearwardly a short distance away from the arm 12 of the handle 11. Opposite lugs 51 are formed upon the handle 50 and extend outwardly therefrom so as to limit the outward rotation of the links 19 about the bolt 20. A hole 52 is formed in the neck 49 so as to be substantially in alignment with the bore 41 of the free jaw 23 when the tongs and members are disposed in open position. A coiled compression spring 55 is disposed in the bore 41 so that one end thereof bears against the material on opposite sides of the slot 40, and the other end is connected to a wire 56 which extends through the spring, the slot 40, and the hole 52. Here the wire 56 is attached to a washer 57, so that the spring 55 tends to move the free jaw 23 about the pin 21 into open position and also tends to rotate the link element 45 about the pin 47 into the position in which it is shown in Fig. 5.

Link element 45 is provided with integral ears 60 upon opposite faces of the body 48 so as to project forwardly therefrom, the ears 60 being spaced apart the same distance as the ears 15. A hole 61 is formed through the body 48 of the link element 45 for a purpose to be described later. A main jaw 62 is formed upon the interior of the link element 45, the gripping surface of the main jaw 62 having substantially the same radius of curvature as that of the pipe 35. As clearly seen in Fig. 5, the ears 60 extend beyond the upper edge of the body 48 of the link element 45 to form latch jaw operating prongs 63.

The latch jaw 44 includes a body portion 66, the inner end 67 of which is pivotally mounted between the ears 60 by a pin 68. The body 66 has a gripping face 70 formed on the inner edge thereof and at its outer end a hook 71 for a purpose which will be described later. Reinforcing flanges 72 are formed on opposite faces of the body 66 along the inner edge thereof so as to be integral with and reinforce the body 66. The body 66 is shaped to form a horn engaging lug 74 which, when the members of the tongs are in open position, is disposed within and in contact with the horn 14 of the tongs handle 11. A narrow slot 75 is formed in the body 66 medially between the opposite side faces thereof and adjacent to the pin 68. A bore 77 is formed diagonally through the body 66 and with its axis in alignment with the slot 75, one end of this bore terminating at the slot.

A coil compression spring 78 is disposed in the bore 77 with one end of the spring resting against the shoulders adjacent to the slot 75 and with the other end of the spring attached to a flexible wire or cable 80 which extends through the spring, the slot 75, and the hole 61, it being then secured to a washer 82 which bears against the link element 45. As will be clearly seen, the compression spring 78 tends to rotate the latch jaw 44 inwardly about the pin 68, but is prevented from thus rotating the latch jaw 44 when the parts are in open position by the engagement of the horn engaging lug 74 with the horn 14. Moreover when the parts are in open position, as shown in Figs. 1 and 5, the link element 45 is prevented by the spring 55 from rotating about the pin 47, so as to permit the latch jaw 44 to be rotated inwardly by the spring 78. It is thus seen that the spring 55 operates to hold all the parts in open position even against the tendency of the spring 78 to close the latch jaw 44.

The above will be particularly apparent upon an examination of Fig. 5 of the drawings, it being evident that with the flanges 30 of the free jaw 23 engaging the projections 36 formed on the links 19, said jaw 23 cannot open further and thus the full tension of the spring 55 is exerted to pull the handle 50 of the link element 45 away from the tong handle 11. This will cause the forward ends 60 of the element 45 to be forcefully urged towards the horn 14 of the tong handle member so that engagement of the lug 74 of the latch jaw 44 with said horn will prevent a closing of said latch jaw, this predomination of the tension of the spring 55 over that of the spring 78 being due to the fact that with the parts in open position the pull of the spring 78 is directed almost radially in relation to the supporting pivot pin 68 of said latch jaw 44.

Figure 2:
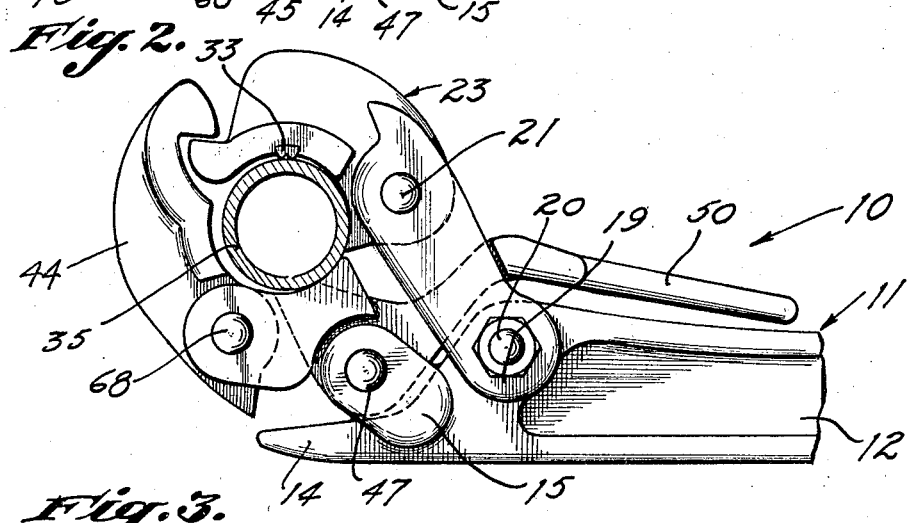
Fig. 2 is a view similar to Fig. 1 showing the members of the pipe tongs in latching position.

The operation of my improved pipe tong is as follows:

With the parts of the pipe tongs in open position, the tongs are moved in the direction of the arrow 90 so that the pipe 35 passes between the free jaw 23 and the latch jaw 44, as shown in Fig. 1. As the movement in the direction 90 is continued, the pipe 35 comes in pressural contact with the operating heel 28 and the operating prongs 63, thus causing the free jaw 23 to be rotated inwardly about the pin 21 to the closed position in which this jaw 23 is shown in Fig. 2, and also causes the link element 45 to be rotated about the pin 47 so as to free the latch jaw 44 from engagement with the horn 14. With the free jaw 23 thus moved inwardly into closed position and the latch jaw 44 free to rotate inwardly in response to the pressure of the spring 78, the hook 71 is swung over the toe 29 and the parts of the tongs are now disposed in latching position as shown in Fig. 2. The whole operation of adjustment of the parts from open position, as shown in Fig. 1, to the latching position, as shown in Fig. 2, takes but a small fraction of a second, this movement being completed practically instantaneously. Thus the tongs of my invention bring about a great saving of the time which is usually spent in the adjustment of the members of the tongs about the pipe after the tongs are applied thereto.

Figure 3:
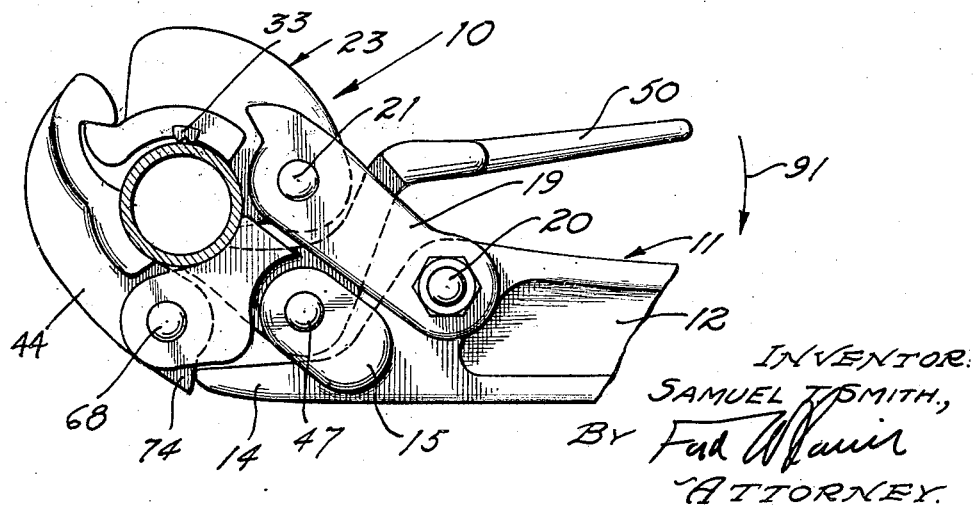
Fig. 3 is a similar view to Fig. 2 showing the members of the tongs in gripping position.

In order to bring the members of the tongs from their latching position, shown in Fig. 2, to their gripping position shown in Fig. 3, the handle 11 is moved in the direction of the arrow 91, which brings the horn 14 into locking relation with the horn engaging lug 74. This effectively locks the members against displacement from their latching position and, moreover, draws the free jaw 23 inwardly against the pipe 35 so that the tooth 33 engages with the outer surface of the pipe, thereby firmly uniting the tongs with the pipe. This locking of the members against displacement is a feature of great importance to this invention, as accidents due to tongs becoming disengaged from the pipe are frequent in the oil fields and, due to the locking means of my tongs, these accidents will be entirely prevented.

In order to disengage the jaws from the pipe 35, the unlocking handle 50 is manually depressed as shown in Fig. 2 so as to move the tong members into latching position whereupon the latch jaw 44 may be manually swung to open position, the handle 50 being released at this time so that the latch jaw 44 will be retained in open position permitting the tongs to be withdrawn from the pipe with the parts positioned as shown in Fig. 1.

It will be seen that I have produced a pair of pipe tongs which in addition to having the advantages referred to above, consists of but few members and, therefore, may be built ruggedly and thus withstand the hard wear to which tools are subjected in the oil fields.

I claim as my invention:

1. In tongs adapted to grip a pipe, the combination of: a handle; a free jaw; link means connecting said free jaw to said handle; a link element pivoted to said handle; a main jaw provided on said link element; a latch jaw pivotally mounted on said link element; means for yieldably urging said latch jaw into a closed position; and means for yieldably urging said latch jaw relative to said handle to hold it in open position, said free jaw and said latch jaw, while in open positions, being responsive to contact with a pipe to cause said jaws to move into closed positions about said pipe.

2. In tongs adapted to grip a pipe, the combination of: a handle; a free jaw; link means connecting said free jaw to said handle; a link element pivoted to said handle; a main jaw provided on said link element; a latch jaw pivotally mounted on said link element; means for yieldably urging said latch jaw into a closed position; and means for yieldably urging said free jaw into an open position and yieldably urging said latch jaw relative to said handle to hold it in open position, said free jaw and said latch jaw, while in open positions, being responsive to contact with a pipe to cause said jaws to move into closed positions about said pipe.

3. In tongs adapted to grip a pipe, the combination of: a handle; a free jaw; link means connecting said free jaw to said handle; a link element pivoted to said handle; a main jaw provided on said link element; a latch jaw pivotally mounted on said link element; means for yieldably urging said latch jaw into a closed position; and means for yieldably urging said latch jaw relative to said handle to hold it in open position, said free jaw and said latch jaw, while in open positions, being responsive to contact with a pipe to cause said jaws to move into closed positions about said pipe, said latch jaw being retained in closed position by contact with said handle during the biting movement thereof.

4. In tongs adapted to grip a pipe, the combination of: a handle; a free jaw; link means connecting said free jaw to said handle; means for yieldably holding said free jaw in an open position; a link element pivotally mouted on said handle; a main jaw provided on said link element; a latch jaw pivotally mounted on said link element; means for holding said latch jaw in an open position; and means operated by moving said tongs into gripping relation with said pipe, for causing said jaws to move into closed positions about said pipe, and causing said latch jaw to move into latching relation with said free jaw, said latch jaw being retained in closed position by contact with said handle during the biting movement thereof.

5. In tongs adapted to grip a pipe, the combination of: a handle; a free jaw; link means connecting said free jaw to said handle; a link element pivotally mounted on said handle; a main jaw provided on said link element; a latch jaw pivotally mounted on said link element, said latch jaw and said free jaw having open and closed positions for receiving and gripping said pipe respectively; and means for yieldably urging said link element to retain said latch jaw in closed position by virtue of its position relative to said handle.

6. In tongs adapted to grip a pipe, the combination of: a handle; a free jaw; link means connecting said free jaw to said handle; a link element pivoted to said handle;

a main jaw formed on said link element; a latch jaw pivotally mounted on said link element, said latch jaw and said free jaw having open and closed positions for receiving and gripping said pipe respectively; and means for yieldably urging said link element to retain said latch jaw in open position by virtue of its position relative to said handle.

7. In tongs adapted to grip a pipe, the combination of: a handle; a free jaw; link means connecting said free jaw to said handle; a link element pivotally mounted on said handle; a main jaw formed on said link element; a latch jaw pivoted on said link element, said latch jaw and said free jaw having open and closed positions for receiving and gripping said pipe respectively; and means for yieldably urging said link element to retain said latch jaw in open or closed position by virtue of its position relative to said handle.

In testimony whereof, I have hereunto set my hand at Los Angeles, California, this 27th day of December, 1926.

SAMUEL T. SMITH.